(12) United States Patent
Goda (10) Patent No.: US 8,786,886 B2
(45) Date of Patent: Jul. 22, 2014

(54) IMAGE FORMING APPARATUS, METHOD FOR CONTROLLING IMAGE FORMING APPARATUS, AND PROGRAM

(75) Inventor: Keigo Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 13/410,009

(22) Filed: Mar. 1, 2012

(65) Prior Publication Data
US 2012/0229839 A1    Sep. 13, 2012

(30) Foreign Application Priority Data

Mar. 8, 2011    (JP) .................................. 2011-050425

(51) Int. Cl.
*G06F 3/12*    (2006.01)
*G06K 15/00*    (2006.01)

(52) U.S. Cl.
USPC ........ 358/1.15; 358/1.13; 358/1.16; 358/1.14

(58) Field of Classification Search
CPC .................................................. G06K 15/4055
USPC .................................. 358/1.1–1.9, 1.11–1.18
See application file for complete search history.

(56) References Cited

U.S. PATENT DOCUMENTS

2006/0055964 A1*    3/2006    Tsuchitani ................... 358/1.15

FOREIGN PATENT DOCUMENTS

| JP | 2003-241582 | * | 1/2003 |
| JP | 2008-122752 | * | 5/2008 |
| JP | 2008-122752 | A | 5/2008 |

* cited by examiner

*Primary Examiner* — King Poon
*Assistant Examiner* — Ibrahim Siddo
(74) *Attorney, Agent, or Firm* — Canon USA, Inc., IP Division (57) ABSTRACT

The present invention relates to an image forming apparatus capable of controlling an image forming unit and operating in any one of a plurality of power modes including a first power mode and a second power mode which consumes less power than the first power mode. The image forming apparatus includes an activation unit configured to activate the image forming apparatus, an adjustment unit configured to adjust the image forming unit when the activation unit activates the image forming apparatus, a shift unit configured to shift the image forming apparatus to the first power mode or the second power mode after the activation unit completes the activation of the image forming apparatus, and a control unit configured to control the adjustment unit not to adjust the image forming unit when the shift unit shifts the image forming apparatus to the second power mode.

5 Claims, 8 Drawing Sheets

| START PREPARATION REBOOT FLAG | DURING BOOT | DURING RELEASE OF SUSPEND | | | |
|---|---|---|---|---|---|
| | | RELEASE BY POWER SWITCH 301 | RELEASE BY OPERATION UNIT 5 | RELEASE BY LAN 8 | RELEASE BY FACSIMILE APPARATUS 7 |
| YES | LOW | HIGH | HIGH | LOW | LOW |
| NO | HIGH | HIGH | HIGH | LOW | LOW |

IMAGE FORMING APPARATUS, METHOD FOR CONTROLLING IMAGE FORMING APPARATUS, AND PROGRAM

BACKGROUND OF THE INVENTION

1. Field of the Invention

The present invention relates to an image forming apparatus configured to perform power saving processing, a method for controlling the image forming apparatus, and a program.

2. Description of the Related Art

In a recent image forming apparatus, a period of time elapsed since a user operated a power switch until the user can actually operate the apparatus has intended to be lengthened due to multifunctionalization or the like. One of factors is that software for operating a controller configured to control the image forming apparatus increases in scale as it is multifunctionalized.

On the other hand, there is a method for not actually powering off the whole image forming apparatus when a user performs a power-off operation but remaining a memory of the controller in a sort of a standby state where it remains powered on. In this method, a state during a normal operation of the controller is retained in the memory in the standby state. Thus, the image forming apparatus can be made operable in a short time using a content of the memory when the user performs a power-on operation next time.

However, the software on the controller has a large number of internal states. One example is a state of a screen to be displayed on an operation unit. In the above-described method, the content of the memory during the power-off operation is retained. When the image forming apparatus becomes operable, therefore, the state of the controller is similar to that during the power-off operation. Generally, the user who operates a power switch expects that the image forming apparatus is in a similar state to that when it is started from an original power-on state. Therefore, the above-described method is not preferable.

In addition, when the content of the memory of the controller continues to be retained, as described above, reset control is not applied to the software operating on the controller. A malfunction occurring when the software is not reset for a long time is generally known. One example is fragmentation of the memory, which causes an operating speed to be reduced and causes an abnormality to occur in an operation. Ideally, the software is also preferably reset.

Therefore, a method can be considered which performs reboot once when the user performs the power-off operation, and then retains the content of the memory to bring the controller into the standby state. Such a configuration can ensure that an internal state of the controller retained in the memory is similar to that when the image forming apparatus is started using a normal method. Further, the software can be reset by performing the reboot.

On the other hand, when the image forming apparatus actually performs operations such as copying and printing after the user performs the power-on operation, respective engines of a printer unit and a scanner unit are required to complete their adjustment operations. Therefore, the adjustment operations of the engines are generally started in synchronization with startup of the controller and return from a power saving state to shorten a waiting time elapsed since the power-on operation was performed. When the above-described method including the reboot is introduced into the image forming apparatus, the adjustment operations of the engines are performed during the reboot, so that useless power is consumed and an operating sound may increase.

On the other hand, as a conventional technique, there is a technique for controlling determination whether start of an adjustment operation of an engine is synchronized with startup of a controller and return from a power saving state by a signal line connected between the controller and the engine (Japanese Patent Application Laid-Open No. 2008-122752). In this discussion, if the controller notifies an image forming unit (engine) that the adjustment operation is not synchronized via the signal line, the adjustment operation is performed before an operation such as printing is performed later.

However, in a configuration discussed in the conventional technique, the notification via the signal line as to whether the adjustment operation of the engine is synchronized is controlled only when the image forming apparatus returns from the power saving state. More specifically, in the conventional technique, when the power saving state of the image forming apparatus is released, control for changing the notification via the signal line is performed under condition of a factor of release. In the conventional image forming apparatus, the notification of the determination whether the adjustment operation is synchronized at the time of startup of the controller is neither controlled nor changed depending on the condition or the like.

If the user performs a power-off operation for the image forming apparatus, therefore, it is difficult to perform control so as not to perform the adjustment operation of the engine when a method for retaining a content of a memory to bring the controller into a standby state after reboot is performed once is used.

SUMMARY OF THE INVENTION

The present invention is directed to a mechanism for enabling shift to a power saving state while completing start preparation of a controller without performing mechanical initialization processing relating to an image processing unit when receiving an operation to turn off a power source. The present invention is further directed to a mechanism for enabling a period of time elapsed since an instruction to perform an operation to turn on the power source next time is issued until an image forming apparatus can actually be used to be shortened.

According to an aspect of the present invention, an image forming apparatus capable of controlling an image forming unit and operating in any one of a plurality of power modes including a first power mode and a second power mode which consumes less power than the first power mode, includes an activation unit configured to activate the image forming apparatus, an adjustment unit configured to adjust the image forming unit when the activation unit activates the image forming apparatus, a shift unit configured to shift the image forming apparatus to the first power mode or the second power mode after the activation unit completes the activation of the image forming apparatus, and a control unit configured to control the adjustment unit not to adjust the image forming unit when the shift unit shifts the image forming apparatus to the second power mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.
<Description of System Configuration>

Figure 1:
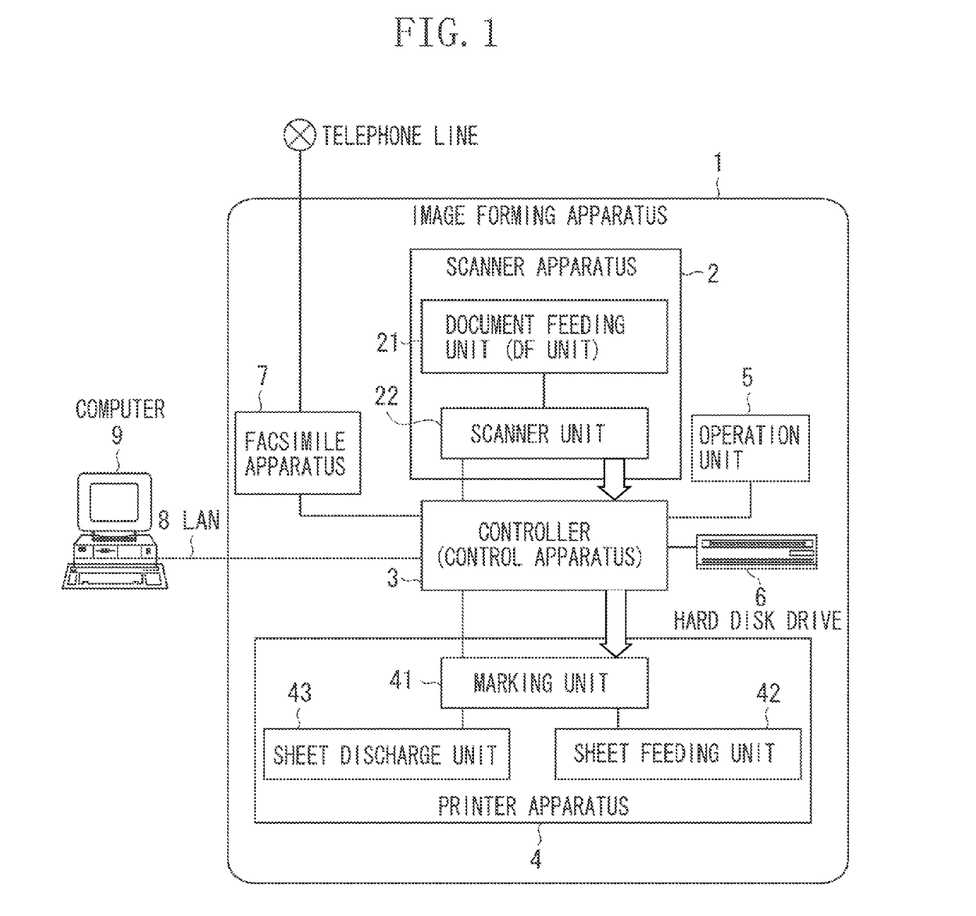
FIG. 1 is a block diagram illustrating a configuration of an image forming apparatus according to an exemplary embodiment of the present invention.

FIG. 1 is a block diagram illustrating a configuration of an image forming apparatus 1 according to an exemplary embodiment of the present invention. While a multifunction peripheral including a print function, a scanner function, and a facsimile communication function is taken as an example in the present exemplary embodiment, the present invention may be applied to a printer apparatus. The image forming apparatus 1 according to the present exemplary embodiment has a power control function of shifting to a standby state by limiting supply of power.

In FIG. 1, a scanner apparatus (scanner unit) 2 optically reads an image from a document, and converts the image into a digital image. A printer apparatus (printer unit) 4 outputs the digital image onto a paper medium. The printer apparatus 4 is the target of the operation. A hard disk drive (HDD) 6 stores a digital image, a control program, and so on. A facsimile apparatus 7 transmits the digital image to a telephone line or the like. A controller 3 is connected to each of the above-described apparatuses, and issues an instruction to each of its modules to execute a job on the image forming apparatus 1. The image forming apparatus 1 can also input and output the digital image to and from a computer 9 via a local area network (LAN) 8, issue a job, and designate the apparatus.

In the scanner apparatus 2, a document feeding unit 21 sequentially replaces a document bundle automatically. A scanner unit 22 optically scans a document, converts the document into a digital image, and transmits the converted image data to the controller 3.

In the printer apparatus 4, a sheet feeding unit 42 sequentially feeds sheets one at a time from a sheet bundle. A marking unit 41 prints image data on the fed sheet. A sheet discharge unit 43 discharges the sheet after the printing.

An operation unit 5 includes an operation button and a display panel (not illustrated) for enabling a user to instruct the image forming apparatus 1 to perform an operation such as image copying and presenting various types of information of the image forming apparatus 1 to the user. A user interface (UI) screen for receiving a power-off instruction from the user can be displayed on the operation unit 5. When the operation unit 5 receives the power-off instruction to the UI screen, a central processing unit (CPU) 201, which is described below, performs shutdown processing for a controller to complete start preparation and to shift to a power saving state, illustrated in a below-described flowchart.

The image forming apparatus 1 includes the following functions and can execute a wide variety of jobs.
1) Copying function
An image read from the scanner apparatus 2 is recorded on the hard disk 6, and is simultaneously printed using the printer apparatus 4.
2) Image transmission function
The image read from the scanner apparatus 2 is transmitted to the computer 9 via the LAN 8.
3) Image storage function
The image read from the scanner apparatus 2 is recorded on the hard disk 6, and is transmitted and printed, as needed.
4) Image printing function
A page description language, for example, transmitted from the computer 9 is analyzed, and is printed by the printer apparatus 4.

Figure 2:
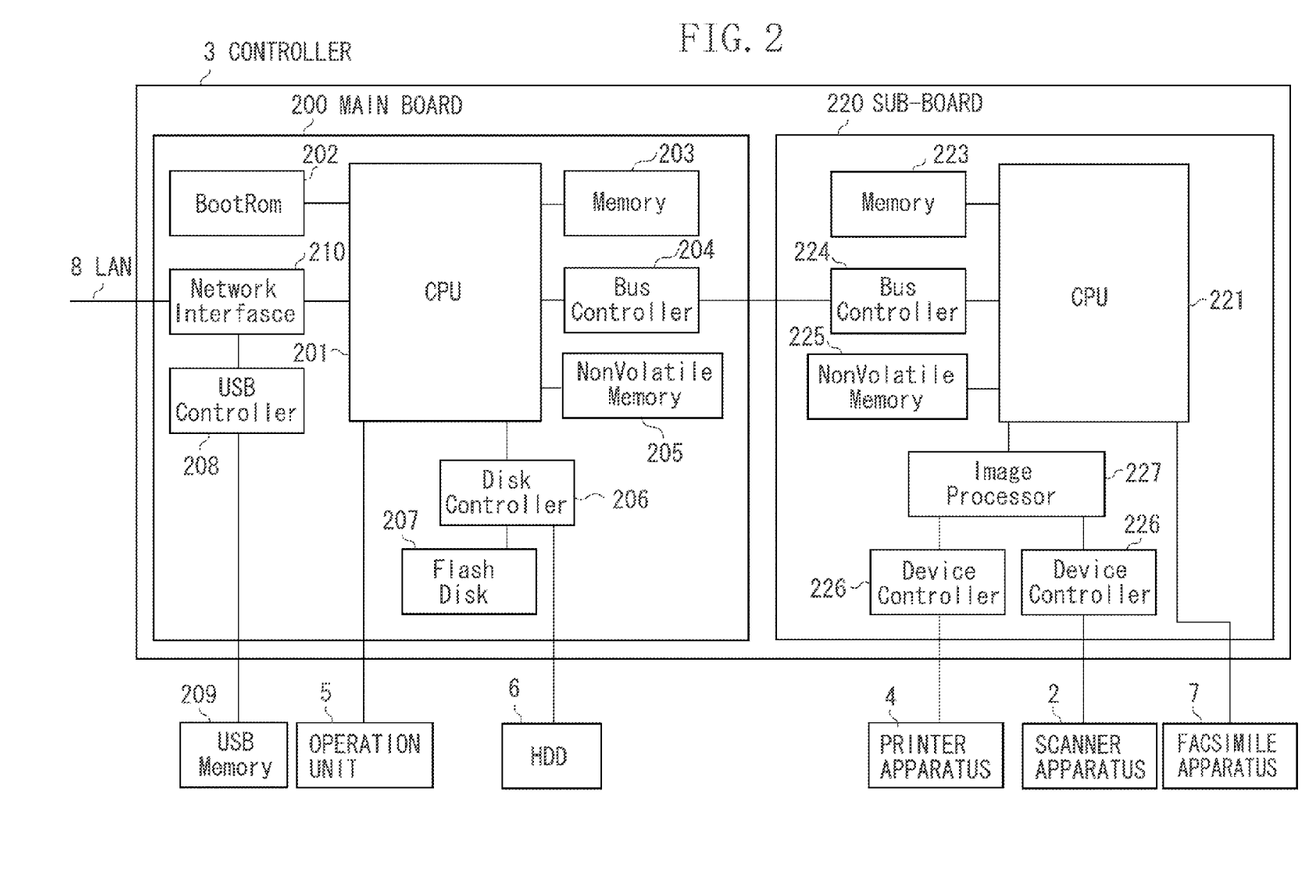
FIG. 2 is a block diagram illustrating a configuration of a controller.

FIG. 2 is a block diagram illustrating a configuration of the controller 3 illustrated in FIG. 1. The controller 3 illustrated in this example includes a main board 200 and a sub-board 220.

In FIG. 2, the main board 200 is a general-purpose CPU system. The main board 200 includes the CPU 201 that controls the entire board, a boot read-only memory (ROM) 202 including a boot program referred to as a basic input/output system (BIOS), and a memory 203 that the CPU 201 uses as a work memory.

A bus controller 204 has a bridge function to an external bus. A nonvolatile memory (NVM) 205 stores information that is not erased even when the power is turned off. The main board 200 further includes a disk controller 206 that controls a storage device, a flash disk (e.g., a solid-state drive (SSD)) 207 serving as a relatively small-capacity storage device including a semiconductor device, and a universal serial bus (USB) controller 208 capable of controlling a USB. The flash disk 207 stores an operating system (OS) executed by the CPU 201 and an executable program such as firmware.

A USB memory 209, the operation unit 5, and the hard disk 6, which are outside the main board 200, are connected thereto. The LAN 8 is connected to the main board 200 via a network interface 210.

The sub-board 220 includes a relatively small general-purpose CPU system and image processing hardware. The sub-board 220 includes a CPU 221 that controls the entire board, a memory 223 that the CPU 221 uses as a work memory, a bus controller 224 having a bridge function to an external bus, and a nonvolatile memory 225 storing information that is not erased even when the power is turned off. The sub-board 220 further includes an image processor 227 that performs real-time digital image processing and device controllers 226.

The scanner apparatus 2 and the printer apparatus 4, which are outside the controller 3, transfer digital image data via the device controllers 226. The CPU 221 directly controls the facsimile apparatus 7.

A lot of CPU peripheral hardware such as a chip set, a bus bridge, and a clock generator is described in a simplified manner, although included in each of the CPU 201 and the CPU 221. Such a block configuration does not limit the present invention. Image copying using a paper medium is taken as an example, to describe an operation of the controller 3.

When the user issues an instruction to copy an image from the operation unit 5, the CPU 201 transmits an image reading instruction to the scanner apparatus 2 via the CPU 221. The scanner apparatus 2 optically scans a paper document, converts the paper document into digital image data, and inputs the digital image data to the image processor 227 via the device controller 226. The image processor 227 performs direct memory access (DMA) transfer to the memory 223 via the CPU 221, and temporarily stores the digital image data.

When the CPU 201 can confirm that a predetermined amount or the whole amount of the digital image data enters the memory 223, the CPU 201 issues an image output instruction to the printer apparatus 4 via the CPU 221. The CPU 221 informs to the image processor 227 a position of the image data on the memory 223, and transmits the image data on the memory 223 to the printer apparatus 4 via the image processor 227 and the device controllers 226 according to a synchronization signal from the printer apparatus 4. Thus, the printer apparatus 4 prints the digital image data on the paper medium.

When a plurality of print copies is made, the CPU 201 stores the image data on the memory 223 in the hard disk 6, so that the image can be transmitted to the printer apparatus 4 even if it does not receive the image from the scanner apparatus 2 for the second and the subsequent print copies.

Figure 3:
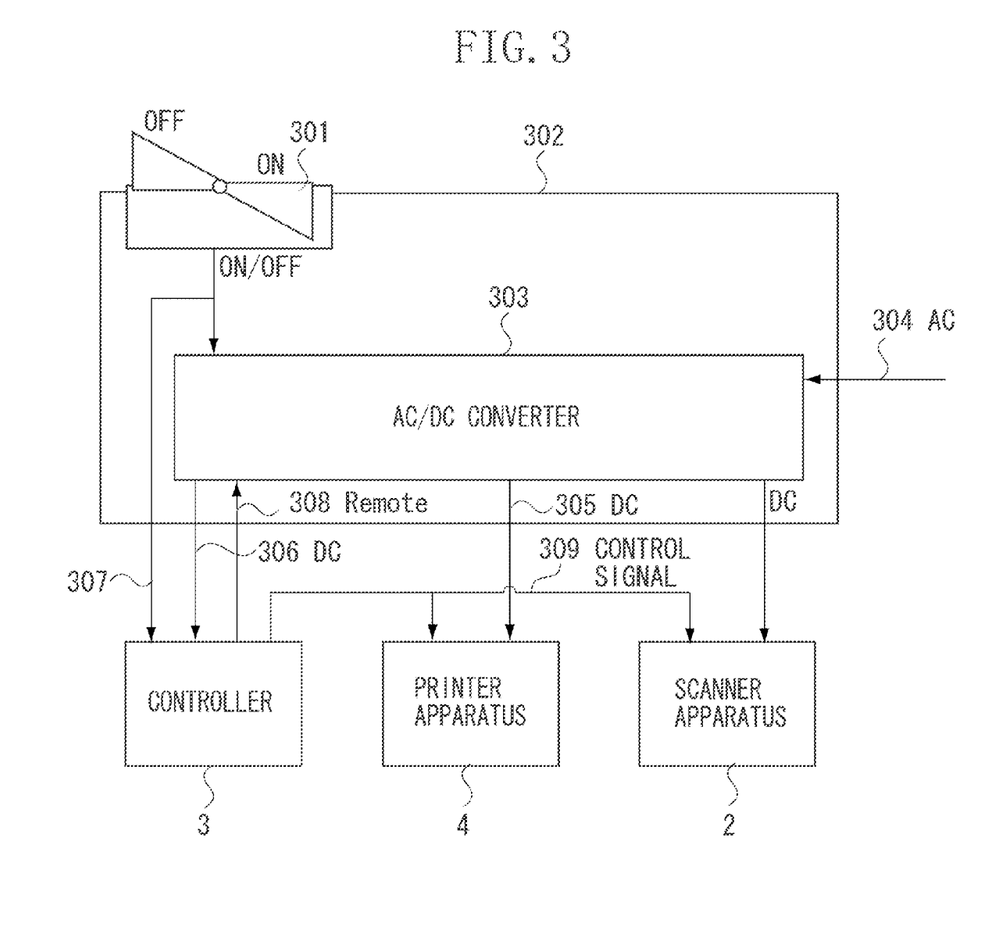
FIG. 3 is a block diagram illustrating devices relating to power control of the image forming apparatus.

FIG. 3 is a block diagram illustrating a configuration of the devices relating to power source control of the image forming apparatus 1 illustrated in FIG. 1.

In FIG. 3, a toggle-type switch (hereinafter merely referred to as a switch) 301 issues an instruction to turn off or on an alternating current/direct current (AC/DC) converter 303 serving as a power supply unit. A power supply unit 302 includes the AC/DC converter 303 which converts AC power input by an AC power source input unit 304 into DC power. A power cable 305 supplies DC power to the printer apparatus 4.

A power cable 306 supplies power to the controller 3. The controller 3 is notified of a state of the switch 301 using a control signal 307. The controller 3 outputs a power source remote signal 308 to the AC/DC converter 303. The controller 3 outputs a control signal 309 to the printer apparatus 4 and the scanner apparatus 2 during their adjustment operations immediately after being powered on.

The user can turn on and off the image forming apparatus 1 by operating the switch 301. The switch 301 is connected to the AC/DC converter 303 when turned on, and can control a power-on state of the power supply unit.

When the switch 301 is off, the controller 3 is not to stop supplying power to the power cable 306 until its system finishes being shut down. More specifically, the controller 3 is notified of the state of the switch 301 using the control signal 307, and turns off the power cable 306 using the power source remote signal 308 after the system finishes being shut down. The foregoing describes a power source configuration of a general apparatus that is required to be shut down.

The switch 301 can mechanically retain either one of an ON state and an OFF state. The user turns the switch 301 to either one of ON and OFF positions, to input the state to the controller 3.

While the switch 301 having explicit ON and OFF states is used in the present exemplary embodiment, a large number of personal computers use switches having no ON and OFF states (including switches themselves functioning as power saving shift switches).

The switch having no ON and OFF states has the following features 1) to 3):
1) having a control pattern for functioning as an "OFF state/instruction to shift to a power saving state" while the apparatus is powered on;
2) having a control pattern for functioning as an "ON" state while the apparatus is powered off; and
3) having a control pattern for inputting of "forced OFF" by continuing to press the switch for a predetermined time period or more.

According to the present exemplary embodiment, the configuration is not limited to the switch 301. When the present exemplary embodiment is applied to the switch having no ON and OFF states, the ON and OFF states of the switch 301 may be applied to the ON and OFF patterns in the foregoing items 1) and 2).

While the printer apparatus 4 and the scanner apparatus 2 according to the present exemplary embodiment respectively perform initialization operations immediately after being powered on, it is determined whether they respectively perform adjustment operations by referring to a signal level of the control signal 309 in the case. The printer apparatus 4 and the scanner apparatus 2 immediately perform the adjustment operations when the control signal 309 is at a high level, and does not perform the adjustment operations at the time point where the control signal 309 is at a low level but performs the adjustment operations immediately before first performing a copying operation and a printing operation.

At this time, it is configured that the signal level of the control signal 309 is determined up to the time point where the printer apparatus 4 and the scanner apparatus 2 are powered on. More specifically, the printer apparatus 4 and the scanner apparatus 2 are configured to perform adjustment operations in synchronization with power-on of the controller 3 when the control signal 309 enters a high level.

While the control signal 309 is shared between the printer apparatus 4 and the scanner apparatus 2 in the present exemplary embodiment. However, this configuration is merely an example. Independent signals may be respectively provided in the printer apparatus 4 and the scanner apparatus 2.

The image forming apparatus 1 according to the present exemplary embodiment has a sleep function of shifting to a power saving state in which power consumption is reduced when no operation such as copying has been performed for a predetermined period of time. While the control signal 309 is also used at the time of return from the power saving state to a normal state in the present exemplary embodiment, details thereof will be described below.

Figure 4:
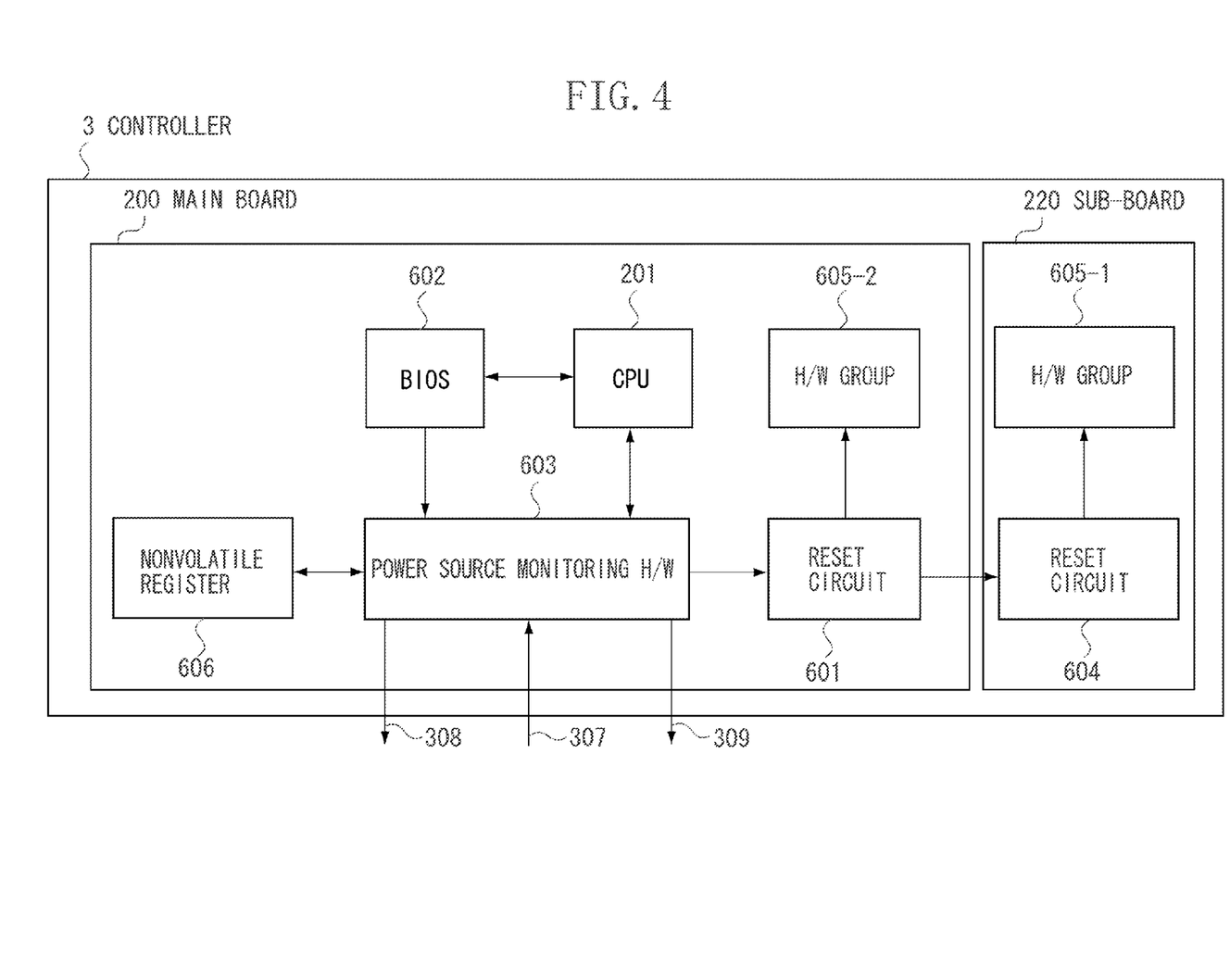
FIG. 4 is a block diagram illustrating a hardware resource of the controller.

FIG. 4 is a block diagram illustrating a hardware resource of the controller 3 illustrated in FIG. 1. This is an example of a peripheral device such as a power source control/reset circuit of the controller 3.

In FIG. 4, a reset circuit 601 is provided on the main board 200. A basic input/output system (BIOS) 602 controls basic input and output processing of hardware (H/W) on the main board 200.

A power source monitoring H/W 603 monitors power source control for the system of the image forming apparatus 1. The power source monitoring H/W 603 may be a small CPU system when composed of an application specific integrated circuit (ASIC) or the like. The power source monitoring H/W 603 supplies power to the printer apparatus 4 serving as an image processing unit, the scanner apparatus 2, the controller 3, and a memory such as a nonvolatile register 606.

The controller 3 notifies the image processing unit that no adjustment processing is required using the control signal 309 in response to the power monitoring H/W 603 receiving an instruction issued by the switch 301 operated by the user. After the controller 3 performs reboot processing using the memory 203, the power source monitoring H/W 603 performs control to shift to a stand-by state by stopping supplying power to the controller 3 excluding the memory 203. In the present exemplary embodiment, the power source monitoring H/W 603 uses ASIC-3 for starting control to shift to the stand-by state by the BIOS 602.

A reset circuit 604 is provided on the sub-board 220. H/W groups 605-1 and 605-2 are respectively provided on the boards. A state of the nonvolatile register 606 is reset by resetting the H/W, for example.

Internal states of the H/W groups 605-1 and 605-2, which are a synchronization type, are reset by the reset. Therefore, the reset circuits 601 and 604 are required to respectively reset the H/W groups 605-2 and 605-1 after power is supplied to respective H/W chips since the synchronization type H/W groups 605-1 and 605-2 were powered on.

Since the plurality of H/W chips has a master-servant relationship, a reset sequence is designed so that the H/W groups are sequentially reset. Generally, one board includes one reset circuit, and the reset circuit performs the reset operation in each board, as in the present exemplary embodiment.

A system of the main board 200 is specifically a main board in the image forming apparatus 1, and includes the power source monitoring H/W 603. The control signal 307 from the switch 301 is input to the power source monitoring H/W 603. The power source monitoring H/W 603 can control the power supply in the main board 200 using the power source remote signal 308.

If the CPU 201 can normally operate, the system can be reset according to an instruction from the CPU 201. Further, when the power is not supplied to the CPU 201, the power source monitoring H/W 603 controls output of the power source remote signal 308 based on input of the control signal 307 to power on the controller 3. In addition, the power source monitoring H/W 603 has a function of controlling output of the control signal 309. The nonvolatile register 606 can perform reading and writing from and to the CPU 201.

In the controller 3 thus configured, the BIOS 602 includes an H/W control library or the like at a low level. The BIOS 602 is generally used to ensure compatibility of an IBM compatible machine, and not indispensable on a computer system. However, the BIOS 602 is described as being included in the present exemplary embodiment because it can also execute a part of a power saving function by an advanced configuration and power interface (ACPI) standard, for example, The controller 3 according to the present exemplary embodiment has a function of ACPI-S3 (a memory resume) which is generally used as a power saving technique in a personal computer or the like. The BIOS 602 is described for only a part of the function.

In the image forming apparatus 1 having the above-described H/W configuration, when the user turns off the switch 301, the CPU 201 can receive a state of the switch 301 via a path of the control signal 307 and the power source monitoring H/W 603.

More specifically, the CPU 201 normally detects power-off as the state of the switch 301 to operate a shutdown sequence, and issues a shutdown instruction to the power source monitoring H/W 603. As a result, the AC/DC converter 303 is notified of power-off via the power source remote signal 308, and the power cable 306 serving as a DC power supply source of the controller 3 is turned off, so that the system is completely shut down.

The shutdown completely ends a program on the CPU 201. When the switch 301 is turned on next time, therefore, the program on the CPU 201 is started as usual.

An operation for an ACPI-S3 suspend method in the image forming apparatus 1 according to the present exemplary embodiment will be described below.

The CPU 201 calls a power-saving interface (I/F) of the OS, for example, to finally shift to an ACPI-S3 state (stand-by state) serving as a function of the BIOS 602 and the power source monitoring H/W 603. The CPU 201 can cause the power supply unit 302 to shift to an ACPI-S3 power saving state via the power source remote signal 308. In this state, only the memory 203 and a part of the power source monitoring H/W 603 enter a power-on state (power saving state).

At this time, the system is not in the power-off state but in a "temporarily interrupted state" in which a program state is maintained in the memory 203, and can resume execution of a program in a short time when a suspended state is released due to a predetermined external factor.

The image forming apparatus 1 according to the present exemplary embodiment has a function of waiting while a part of the memory 203 or the like remains powered on when the user turns off the switch 301 in order to shorten a waiting time elapsed until an operation such as copying is actually enabled since the user tuned on the switch 301. To make a distinction in description, a state in which the image forming apparatus 1 is normally powered off is referred to as a "power-off state", and a state in which the image forming apparatus 1 waits by the above-described function is referred to as a "quick-off state".

A use case of the image forming apparatus 1 according to the present exemplary embodiment may include a case where the image forming apparatus 1 is desired to enter the power-off state only in a specific case, although normally brought into the quick-off state to shorten a waiting time, for example.

Further, there is a case that the system is desired to enter the power-off state during a long vacation because it only slightly consumes power when in the quick-off state. Therefore, the image forming apparatus 1 according to the present exemplary embodiment is so configured that the user can select to which of the quick-off state and the power-off state the image forming apparatus 1 shifts after turning off the switch 301 by previously operating a predetermined button in the operation unit 5, for example.

[Shutdown Sequence]

Figure 5:
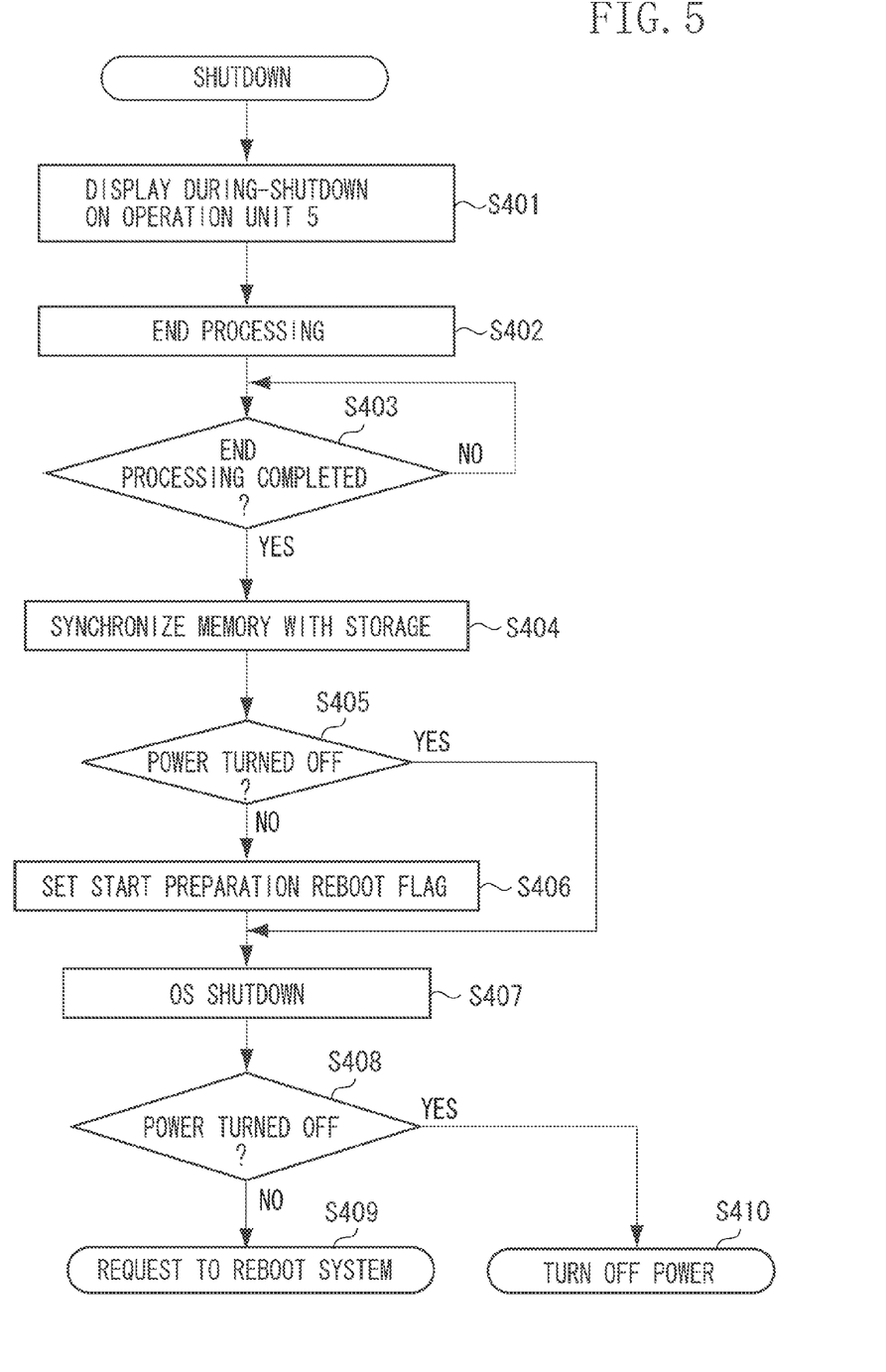
FIG. 5 is a flowchart illustrating a method for controlling the image forming apparatus.

FIG. 5 is a flowchart illustrating a method for controlling the image forming apparatus 1 according to the present exemplary embodiment. This is an example of a shutdown sequence performed by the CPU 201 in the controller 3. Each of steps is implemented when the CPU 201 executes a control program stored in the HDD 6, the NVM 205, or the like. When detecting that the switch 301 is turned off, the CPU 201 executes the processing illustrated in the flowchart. The user previously issues an instruction to determine to which of the quick-off state and the power-off state the image forming apparatus 1 is to shift after the sequence via the operation unit 5 or the like, and a shutdown control flag corresponding to a content of the instruction is retained in the nonvolatile register.

In step S401, the CPU 201 first displays a UI screen during shutdown on the operation unit 5. In step S402, the CPU 201 then performs interruption and end processing for a service or the like currently performed. The end processing is performed concurrently in a plurality of processes. Therefore, in step S403, the CPU 201 waits for a notification that each of the processes ends.

In step S404, the CPU 201 then performs processing for synchronizing a value of the memory 203 with the HDD 6 serving as a storage. For example, the CPU 201 performs processing for immediately writing a storage buffer cached on the memory 203 into the HDD 6, for example.

In step S405, the CPU 201 then determines whether the user previously issues an instruction to shift to the power-off state from a content of the shutdown control flag. If the CPU 201 determines that the user previously issues the instruction to shift to the power-off state from the content of the shutdown control flag (YES in step S405), the processing proceeds to step S407 after skipping an operation in step S406. The determination that the instruction to shift to the power-off state is previously issued from the content of the shutdown control flag means that an instruction to shift to the quick-off state is issued.

On the other hand, if the CPU 201 determines that the instruction to shift to the power-off state is not issued from the content of the shutdown control flag (NO in step S405), the processing proceeds to step S406. In step S406, the CPU 201 sets a start preparation reboot flag. More specifically, the CPU 201 sets in the nonvolatile register 606 a start preparation reboot flag for performing control not to perform adjustment operations of the printer apparatus 4 and the scanner apparatus 2 in the boot processing during shutdown. A content stored in the nonvolatile register 606 is not reset even if the controller 3 is reset.

In step S407, the CPU 201 then calls the shutdown I/F of the OS, to perform software final end processing of the OS (OS shutdown). In step S408, the CPU 201 then determines whether an instruction to shift to the power-off state is previously issued. If the CPU 201 determines that the instruction to shift to the power-off state is not issued (NO in step S408), the processing proceeds to step S409. Whereas if the CPU 201 determines that the instruction is previously issued (YES in step S408), the processing proceeds to step S410.

In step S409, the CPU 201 issues a system reboot request to the power source monitoring H/W 603. Thus, the power source monitoring H/W 603 issues an entire system reset request to the reset circuit 601, and the reset circuit 601 notifies the reset circuit 604 on the sub-board 220 of the entire system reset request. Thus, the reset request is issued to the entire board. This reset request is a reboot request. Therefore, the CPU 201 is also reset, and performs boot processing from the BIOS 602, for example, by issuing a reset exception.

More specifically, the system according to the present exemplary embodiment is rebooted without being powered off regardless of shutdown. A reboot request in the shutdown sequence is a boot sequence illustrated in FIG. 6.

On the other hand, in step S410, the CPU 201 issues a shutdown instruction to the power source monitoring H/W 603. Thus, the AC/DC converter 303 is notified of power-off using the power source remote signal 308. The image forming apparatus 1 enters the power-off state by turning off the power cable 306 serving as the DC power supply source of the controller 3.

[Boot Sequence]

Figure 6:
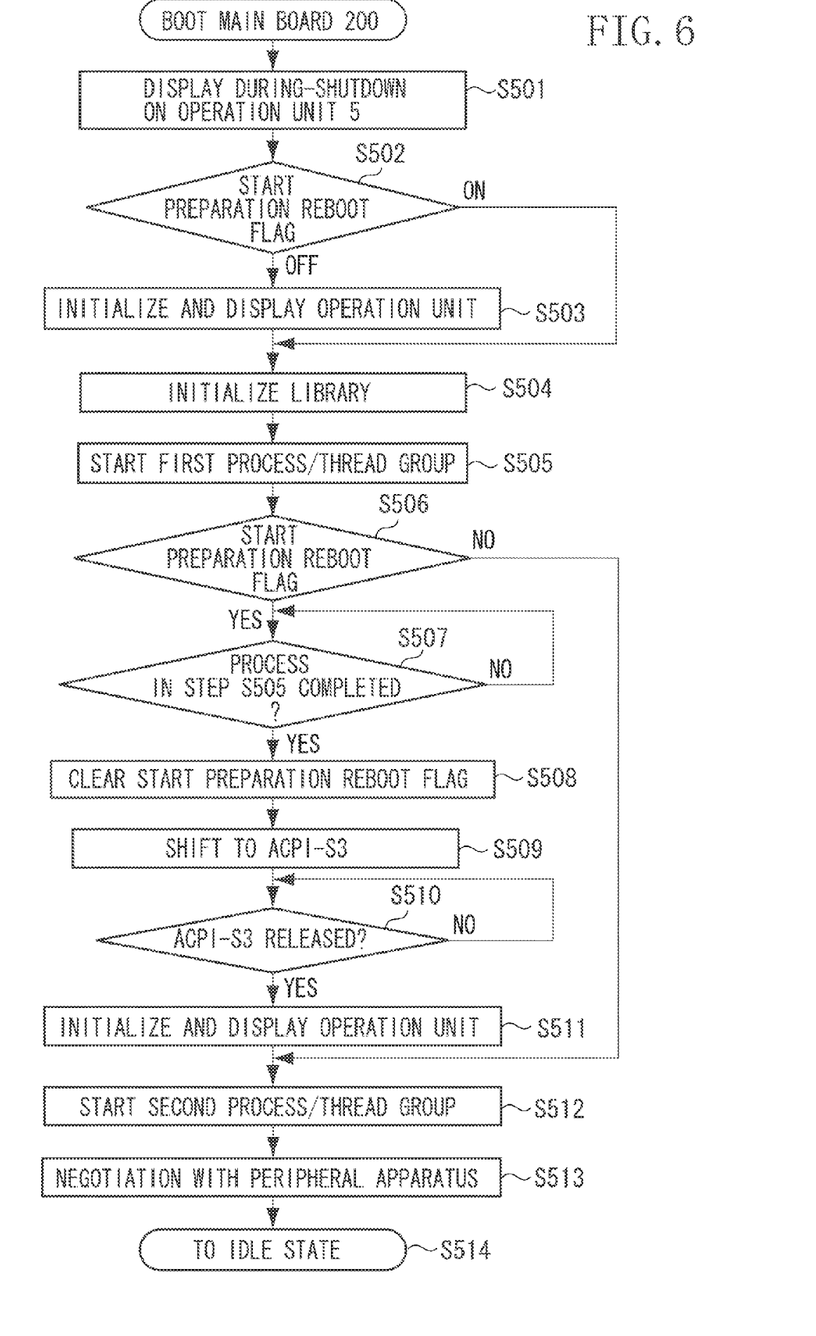
FIG. 6 is a flowchart illustrating a method for controlling the image forming apparatus.

FIG. 6 is a flowchart illustrating a method for controlling the image forming apparatus 1 according to the present exemplary embodiment. This is an example of a boot sequence that the CPU 201 in the controller 3 performs in step S409 and the subsequent steps. Each of steps is implemented when the CPU 201 executes a control program stored in the HDD 6, the NVM 205, or the like. While started in a multistage manner by the system, a booting method is a portion that is quite difficult to describe. Therefore, the concept of processing performed by the CPU 201 will be described as a flow.

The CPU 201 starts processing in the boot sequence illustrated in FIG. 6 when the user turns on the switch 301 from the power-off state or when the reset circuit 601 resets the entire system in step S409.

Figure 7:
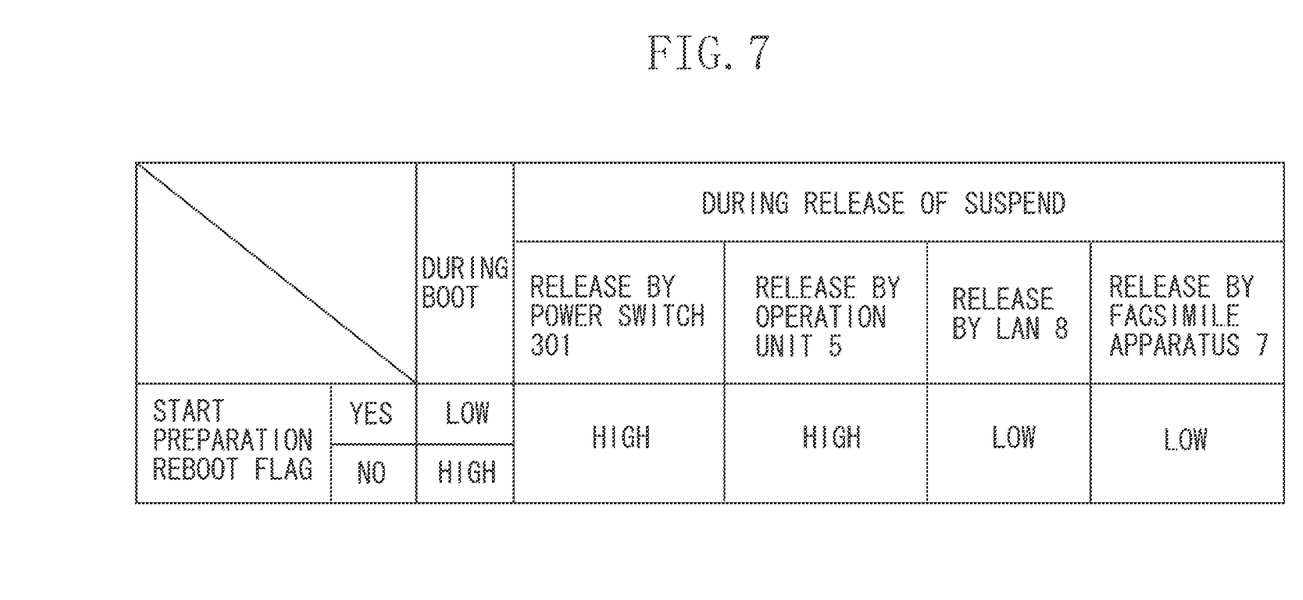
FIG. 7 illustrates an example of a state setting table relating to the controller.

At this time, the power source monitoring H/W 603 sets a signal level of the control signal 309 as illustrated in FIG. 7 based on the start preparation reboot flag stored in the non-volatile register 606 by the CPU 201 in step S406.

While the printer apparatus 4 and the scanner apparatus 2 also start the initialization operations simultaneously with the start of the operation of the CPU 201, control is performed so that the adjustment operations are not performed in response to the control signal 309 when the start preparation reboot flag is set.

When the reboot is performed during the shift to the quick-off state, therefore, the printer apparatus 4 and the scanner apparatus 2 do not consume unnecessary power and generate an operating sound by the adjustment operations.

When starting the processing, in step S501, the CPU 201 initializes the H/W in the controller 3 while displaying a screen indicating during-shutdown on the operation unit 5. The initialization of the H/W may include initialization of a register and an interrupt, and registration of a corresponding device driver in a Kernel boot unit.

In step S502, the CPU 201 then determines whether the start preparation reboot flag set in step S406 illustrated in FIG. 5 is set. If the CPU 201 determines that the start preparation reboot flag is set (ON in step S502), the processing proceeds to step S504 by skipping step S503. More specifically, when the start preparation reboot flag is set, the initialization is continued while a message relating to startup is not displayed on the operation unit 5.

On the other hand, if the CPU 201 determines that the start preparation reboot flag is not set (OFF in step S502), the processing proceeds to step S503. In step S503, the CPU 201 initializes the operation unit 5 and displays "now starting" on the operation unit 5 because the display is first performed.

In step S504, the CPU 201 starts to initialize a software layer. More specifically, the CPU 201 calls an initialization processing routine of each library. In step S505, the CPU 201 starts each first process/thread group. A pure software service, which does not affect peripheral H/W, is mainly appropriate as the startup processing. The reason for this will be described below.

In step S506, the CPU 201 refers to the start preparation reboot flag, which has also been referred to in step S502, to determine again whether the start preparation reboot flag is set. If the CPU 201 determines that the start preparation reboot flag is not set (NO in step S506), the processing proceeds to step S512 because normal startup processing is performed.

On the other hand, if the CPU 201 determines that the start preparation reboot flag is set (YES in step S506), the processing proceeds to step S507 because the current boot is startup for startup preparation. In step S507, the CPU 201 waits until the processing illustrated in step S505 is completed.

If this boot sequence is executed while the start preparation reboot flag is set, the display on the operation unit 5 is not performed, so that the startup processing is being performed.

If the CPU 201 determines that the process in step S505 is completed (YES in step S507), the processing proceeds to step S508. In step S508, the CPU 201 clears the start preparation reboot flag stored in the nonvolatile register 606, and the processing proceeds to step S509. In step S509, the CPU 201 causes the controller 3 to shift to an ACPI-S3 state. A method for the controller 3 to enter the ACPI-S3 state is as described above.

The startup processing is stopped once in the ACPI-S3 state, and the system state of the image forming apparatus 1 according to the present exemplary embodiment enters the quick-off state. At this time, only the memory 203 and the power source monitoring H/W 603 on the main board 200 are powered on. The system consumes only several watts of power as a whole. In the quick-off state, not only the printer apparatus 4 and the scanner apparatus 2 but also the facsimile apparatus 7 and the network interface 210 are not powered on.

Accordingly, in the present exemplary embodiment, a characteristic sequence in the present exemplary embodiment is that the peripheral device of the controller 3 is rebooted without being powered off during shutdown processing, and the system state of the controller 3 enters the power saving state during startup without performing display on the operation unit 5 at the time of next startup. Thus, it seems to the user that the system is not actually rebooted but the shutdown processing is continued longer than usual. Therefore, an uncomfortable feeling can be reduced.

When the main body of the image forming apparatus 1 is used from the quick-off state, the user turns on the switch 301. Consequently, the power source monitoring H/W 603 detects power-on based on a changed state of the control signal 307, and notifies the power supply unit 302 of "turn on switch to turn on an entire apparatus" using the power source remote signal 308.

The power supply unit 302 supplies power to the entire system according to power-on time, more specifically, powers on the controller 3, the printer apparatus 4, and the scanner apparatus 2 via each DC power supply path. At the same time, the power source monitoring H/W 603 determines that a suspended state is released by the switch 301 and sets a signal level of the control signal 309 as illustrated in FIG. 7.

In this case, the printer apparatus 4 and the scanner apparatus 2 respectively start initialization operations by being powered on. While the printer apparatus 4 and the scanner apparatus 2 refer to the control signal 309 to determine whether they respectively perform the adjustment operations, the adjustment operations are performed in this case.

In step S510, the CPU 201 is released from the ACPI-S3 state by turning on the switch 301 and resumes the processing from a program executed state immediately before the shift to the ACPI-S3 state, which has been stored in the memory 203. More specifically, the CPU 201 exits from step S510 illustrated in FIG. 6. In step S511, the CPU 201 initializes the operation unit 5 and displays "now starting" on the operation unit 5.

In step S512, the CPU 201 then starts a second process/ thread group in a program to be started. Only inappropriate ones of programs are activated before the suspended state in the ACPI-S3 state in step S505 to perform communication for startup with mainly peripheral apparatuses, e.g., the printer apparatus 4 and the scanner apparatus 2.

In step S513, the CPU 201 then negotiates with the printer apparatus 4 and the scanner apparatus 2 to establish communication. In step S514, the CPU 201 then shifts to an idle state in step S514.

As described above, when the switch 301 is turned on from the quick-off state, there is no waiting time in the processes from steps S501 to S505 illustrated in FIG. 6, as compared with the case when the switch 301 is turned on from the power-off state.

Therefore, a waiting time elapsed until a copying operation or the like can actually be performed since the user turned on the switch 301 can be significantly shortened.

An operation for a power saving function in the image forming apparatus 1 according to the present exemplary embodiment will be described below.

The image forming apparatus 1 according to the present exemplary embodiment automatically shifts to the power saving state in which power consumption can be reduced when not having performed image forming operations such as a copying operation and a printing operation for a predetermined period of time.

Figure 8:
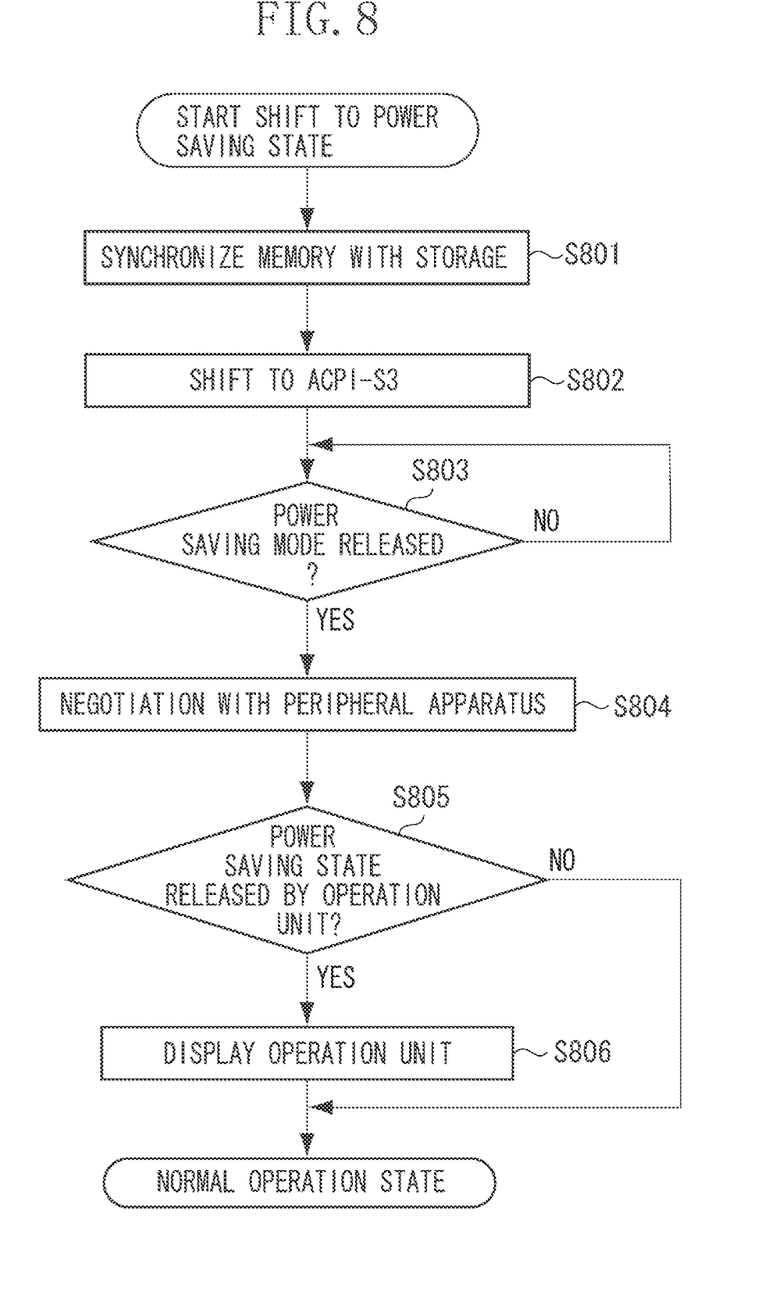
FIG. 8 is a flowchart illustrating a method for controlling the image forming apparatus.

FIG. 8 is a flowchart illustrating a method for controlling the image forming apparatus 1 according to the present exemplary embodiment. This is an example of processing performed by the CPU 201 when the image forming apparatus 1 shifts to the power saving state and returns from the power saving state to the normal state. Each of steps is implemented when the CPU 201 executes a control program stored in the HDD 6, the NVM 205, or the like.

In step S801, the CPU 201 synchronizes a value of the memory 203 with the HDD 6 serving as a storage. An example is synchronization of the content of the storage buffer cached on the memory 203 with the HDD 6.

In step S802, the CPU 201 then causes the controller 3 to shift to an ACPI-S3 suspended state. A method for entering the ACPI-S3 suspended state is as described above. Thus, the image forming apparatus 1 enters the power saving state as a whole.

At this time, in the power saving state in the present exemplary embodiment, the printer apparatus 4 and the scanner apparatus 2 are not powered on but the facsimile apparatus 7 and the network interface 210 are powered on, unlike that in the above-described quick-off state. This is because if the facsimile apparatus 7 receives a facsimile or the network interface 210 receives any data, the power saving state is required to be released so that the controller 3 can perform appropriate processing.

When the image forming apparatus 1 is in the power saving state, the CPU 201 monitors input of an operation from the operation unit 5. In step S803, the CPU 201 determines whether the user has received a request to release a power saving mode in response to an instruction from the operation unit 5 or another device. More specifically, if the facsimile apparatus 7 receives a facsimile or the network interface 210 receive any data, the power saving state is released. A processing operation by the power source monitoring H/W 603 during the release is similar to that when the switch 301 is turned on from the quick-off state.

The power source monitoring H/W 603 sets the signal level of the control signal 309, as illustrated in FIG. 7, due to a factor by which the power saving state has been released. The printer apparatus 4 and the scanner apparatus 2 refer to the control signal 309 to determine whether they respectively perform the adjustment operations.

In the present exemplary embodiment, the image forming apparatus 1 is configured to determine that the user may attempt to use a copying function if the user performs any operation for the operation unit 5, and cause the printer apparatus 4 and the scanner apparatus 2 to perform the adjustment operations in synchronization with the release of the power saving state. Further, the image forming apparatus 1 is configured not to synchronize the adjustment operations in the case that the facsimile apparatus 7 receives a facsimile or the network interface 210 receives data because the printing operation may not be performed due to improper received data or the like. The configuration illustrated in FIG. 7 is a merely example, and the configuration of the present invention is not limited to the example in FIG. 7.

When the power saving state is released according to the above-described instruction, the CPU 201 releases the ACPI-S3 suspended state, and resumes the processing from the program executed state immediately before the shift to the ACPI-S3 state, which has been stored in the memory 203. More specifically, the CPU 201 exits from step S803 illustrated in FIG. 8, and the processing proceeds to step S804. In step S804, the CPU 201 negotiates with the printer apparatus 4 and the scanner apparatus 2 to establish communication.

In step S805, the CPU 201 then determines whether the factor by which the power saving state has been released in step S803 is an operation for the operation unit 5 by the user. If the CPU 201 determines that the factor by which the power saving state has been released in step S803 is the operation for the operation unit 5 by the user (YES in step S805), the processing proceeds to step S806. In step S806, the CPU 201 displays a predetermined operation screen on a display portion of the operation unit 5.

On the other hand, if the CPU 201 determines that the factor by which the power saving state has been released in step S803 is not the operation for the operation unit 5 by the user (NO in step S805), the processing in step S806 is skipped, and the CPU 201 shifts to the normal operation state. More specifically, if the determination result is "NO" in step S805, the user may not in the vicinity of the operation unit 5. Therefore, the CPU 201 does not bring the operation unit 5 into a display state, to reduce power consumption of the operation unit 5. At the timing that the user operates the operation unit 5 later, the CPU 201 brings the operation unit 5 into the display state.

By performing the above-described processing, the image forming apparatus 1 implements the power saving state in which power consumption is reduced, and can perform appropriate operations such as facsimile receiving processing and data receiving from the LAN 8, as required, after returning from the power saving state to the normal state.

As described above, in the image forming apparatus 1 according to the present exemplary embodiment, the memory of the controller 3 remains powered on even if the switch is turned off, so that a time period elapsed until the image forming apparatus 1 can actually be used since an operation for turning on the switch was performed can be shortened. Further, when the user performs an operation for turning off the switch, the controller is rebooted, so that the internal state of the controller 3 can be made similar to that when the controller 3 is started using a normal method. A malfunction such as fragmentation of the memory occurring when software is not reset can be suppressed.

In the image forming apparatus 1 according to the present exemplary embodiment, the adjustment operations of the printer apparatus 4 and the scanner apparatus 2 performed when the controller 3 is rebooted are suppressed, so that unnecessary power consumption when the user performs the operation for turning off the switch can be suppressed. At the same time, the operating sound generated by the adjustment operations can be suppressed.

In the present exemplary embodiment, the processing for shifting to the suspended state using the ACPI-S3 by the BIOS 602 after the start preparation reboot processing is described. However, the image forming apparatus 1 may be configured to include hardware for separately performing shift to a sleep state and sleep release processing in place of the processing by the BIOS 602 so that similar processing can be performed. The image forming apparatus 1 may have a function such as an advanced power management (APM) suspend function.

Aspects of the present invention can also be realized by a computer of a system or apparatus (or devices such as a CPU or an MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-050425 filed Mar. 8, 2011, which is hereby incorporated by reference herein in its entirety.

What is claimed is:

1. An image forming apparatus capable of controlling an image forming unit and operating in any one of a plurality of power modes including a first power mode and a second power mode which consumes less power than the first power mode, the image forming apparatus comprising:
    a power switch;
    a setting unit configured to set a setting for rebooting and shifting to the second power mode when the power switch is turned off;
    a control unit configured to, when the power switch is turned off, turn off the image forming apparatus in a case that the setting is not set by the setting unit, and reboot the image forming apparatus in a case that the setting is set by the setting unit;
    an activation unit configured to, when the power switch is turned on or the image forming apparatus is rebooted, activate the image forming apparatus;
    an adjustment unit configured to, when the activation unit activates the image forming apparatus, adjust the image forming unit in a case that the setting is not set by the setting unit, and does not adjust the image forming unit in a case that the setting is set by the setting unit; and
    a shift unit configured to, when the activation unit completes the activation of the image forming apparatus, shift the image forming apparatus to the first power mode in a case that the setting is not set by the setting unit, and shift the image forming apparatus to the second power mode in a case that the setting is set by the setting unit.

2. A method for controlling an image forming apparatus capable of controlling an image forming unit and operating in any one of a plurality of power modes including a first power mode and a second power mode which consumes less power than the first power mode, the method comprising:
    setting a setting for rebooting and shifting to the second power mode when a power switch is turned off;
    turning off, when the power switch is turned off, the image forming apparatus in a case that the setting is not set by the setting step, and rebooting the image forming apparatus in a case that the setting is set by the setting step;
    activating, when the power switch is turned on or the image forming apparatus is rebooted, the image forming apparatus;
    adjusting, when the activating step activates the image forming apparatus, the image forming unit in a case that the setting is not set by the setting step, and not adjusting the image forming unit in a case that the setting is set by the setting step; and
    shifting, when the activating step completes the activation of the image forming apparatus, the image forming apparatus to the first power mode in a case that the setting is not set by the setting step, and shifting the image forming apparatus to the second power mode in a case that the setting is set by the setting step.

3. A non-transitory computer-readable storage medium storing a program causing an image forming apparatus capable of controlling an image forming unit and operating in any one of a plurality of power modes including a first power mode and a second power mode which consumes less power than the first power mode to execute a method comprising:

setting a setting for rebooting and shifting to the second power mode when a power switch is turned off;

turning off, when the power switch is turned off, the image forming apparatus in a case that the setting is not set by the setting step, and rebooting the image forming apparatus in a case that the setting is set by the setting step;

activating, when the power switch is turned on or the image forming apparatus is rebooted, the image forming apparatus;

adjusting, when the activating step activates the image forming apparatus, the image forming unit in a case that the setting is not set by the setting step, and not adjusting the image forming unit in a case that the setting is set by the setting step; and shifting, when the activating step completes the activation of the image forming apparatus, the image forming apparatus to the first power mode in a case that the setting is not set by the setting step, and shifting the image forming apparatus to the second power mode in a case that the setting is set by the setting step.

4. The image forming apparatus according to claim 1, wherein an adjustment unit adjusts, when the power switch is turned on after shifting of the image forming apparatus to the second power mode, adjust the image forming unit.

5. The image forming apparatus according to claim 1, wherein the shift unit shifts, when the power switch is turned on after shifting of the image forming apparatus to the second power mode, shift the image forming apparatus to the first power mode.

* * * * *